March 18, 1924.

B. G. GOBLE

ARTIFICIAL BAIT

Original Filed May 15, 1922

1,487,556

Inventor
B. G. Goble

By F. K. Bryant.
Attorney

Patented Mar. 18, 1924.

1,487,556

UNITED STATES PATENT OFFICE.

BERT G. GOBLE, OF TULSA, OKLAHOMA.

ARTIFICIAL BAIT.

Continuation in part of application Serial No. 561,203, filed May 15, 1922. This application filed December 12, 1922. Serial No. 606,533.

*To all whom it may concern:*

Be it known that I, BERT G. GOBLE, a citizen of the United States of America, residing at Tulsa, in the county of Tulsa and State of Oklahoma, have invented certain new and useful Improvements in Artificial Bait, of which the following is a specification.

This invention relates to certain new and useful improvements in artificial bait wherein the same is constructed in form similar to a fish and is provided with means rendered operable by the motion of the bait being drawn through the water for causing the same to simulate a swimming motion of a natural fish.

The primary object of the invention is to provide an artificial bait in the form of a fish with the head and body portion integrally formed and with the tail portion articulated to or movably mounted with respect to the rear end of the body portion and rendered operable when the bait is drawn through water to cause movement of the tail portion in simulating the swimming action of a natural fish.

A further object of the invention is to provide a fish bait wherein the tail portion bodily travels in a circuitous path outwardly of the bait body, the diameter of the path being variable to create the impression of a crippled fish, it being well known that fish are readily attracted to crippled ones for consumption thereof, the disposition of the tail creating considerable commotion and rippling when travelling through water and increasing its power of attraction.

This application is filed as a continuation in part, in so far as herein shown and described, of application filed by B. G. Goble on May 15, 1922, Serial No. 561,203 and embodies improvements, and an advance in the art thereover, the basis of this application embodying, what may be termed "a whirl tail" artificial fish bait, wherein the tail member or tail portion of the artificial bait body is caused to whirl when in use or to travel through a circuitous path.

With the above general objects in view and others that will appear as the nature of the invention is better understood, the same consists of the novel form, combination and arrangement of parts hereinafter more fully described, shown in the accompanying drawing and claimed.

Figure 1:
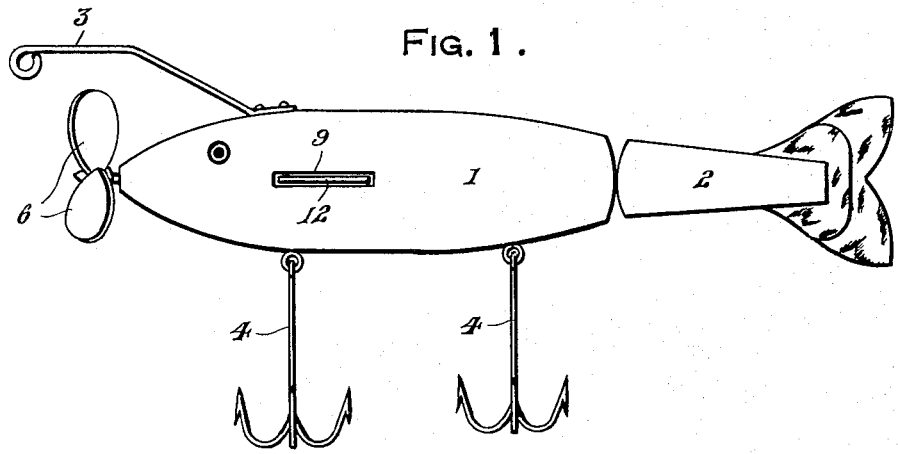

In the drawing, wherein like reference characters designate corresponding parts throughout the several views, Figure 1 is a side elevational view of an artificial bait constructed in accordance with the present invention showing a propeller blade at the head end of the bait for operating the whirling tail portion.

Figure 2:
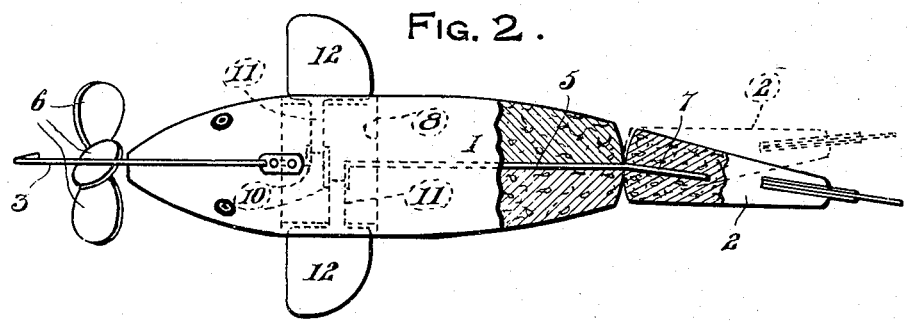
Figure 3:
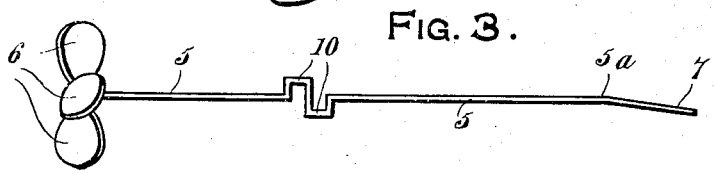

Figure 2 is a top plan view, partly in section showing the crank shaft extending through the body portion of the bait and having an angularly bent end extending into the tail portion with the crank portions of the shaft connected to laterally disposed fin members, and Figure 3 is a side elevational view of the crank shaft showing the screw propeller upon one end and the angularly bent other end that carries the whirling tail portion.

Briefly described, the present invention aims to provide an artificial bait so constructed that when in use being drawn through water, the same will simulate the swimming action of a natural fish to the extent of a peculiar tail movement such as a whirling motion with laterally projecting fin members associated with the sides of the bait body to be moved in circuitous paths transversely of the bait body. To obtain the whirling action of the tail portion, a propeller blade is located at the head end of the bait, the gist of this invention primarily residing in the mounting of and means associated with the tail portion of an artificial bait to cause a whirling action thereof when being drawn through water.

Referring more in detail to the accompanying drawings, there is illustrated an artificial bait embodying the body 1 having a tail portion 2 articulated thereto in a manner to be later described, an upwardly and forwardly directed arm 3 carried by the body 1 adapted to have a fishing line connected thereto while depending hooks 4 are carried by the lower side of the body.

As shown more clearly in Figs. 2 and 3, a shaft 5 is journaled longitudinally through the bait body 1, the forward end of the shaft 5 projecting beyond the head end of the body and having a propeller blade 6 rigidly mounted thereon. The rear end of the shaft 5 is angularly bent at the point 5ª, as clearly shown in Fig. 3, at the rear end of the bait body 1, the angularly projecting rear end 7 of the shaft 5 being rigidly and axially mounted in the tail portion 2 as shown in Fig. 2.

For convenience in manufacture, the bait body 1 may be formed in sections as indicated by the cross-section lines in Fig. 2 to permit the formation of an enlarged socket or compartment 8 in the body portion 1 adjacent the forward end thereof, the opposite side walls of the body having longitudinally extending slotted openings 9 as shown in Fig. 1 that communicate with the compartment 8. The portion of the shaft 5 that extends through the compartment 8 is provided with oppositely directed crank portions 10 upon which the inner ends of the arms 11 carried by the fin members 12 are pivoted as shown in Fig. 2, the fin members 12 extending through the side slotted openings 9 in the side walls of the bait body as shown in Figs. 1 and 2.

In the operation of the device, a fishing line attached to the forward end of the arm 3 draws the artificial bait through the water, the shaft 5 being rotated in the bait body 1 by the forwardly positioned propeller blade 6 secured to the shaft. During this movement, the crank portions 10 upon the shaft 5 move the fin members 12 inwardly and outwardly of the bait body 1, the fin members engaging the opposite walls of the slotted openings 9 forming continuously changing bearing points for the fin members 12 to cause the outer ends thereof to travel in orbital or circuitous paths simulating the natural swimming action of the side fins of a fish. The angularly bent rear end 7 of the shaft 5 being rigidly secured centrally of the tail portion 2 will cause a whirling action or bodily movement in a circuitous path of the tail portion imparting a pronounced movement to the artificial bait when being drawn through water.

By disposing the tail portion of the bait at any angle to the longitudinal axis of the bait body by bending the axle between the body and tail as shown in Figure 2, the tail portion bodily moves in a circuitous path, the diameter of which is greater than the diameter of the bait body, creating the impression of a crippled fish for attraction purposes, and also creating the effect of a fish laboring during swimming movements. Crippled fish readily attract other fish, and by disposing the tail portion at different angles, the crippled effect may be varied as desired.

While there is herein shown and described the preferred embodiment of the present invention, it is nevertheless to be understood that minor changes may be made therein without departing from the spirit and scope of the invention as claimed.

What is claimed as new is:—

1. In an artificial bait, the combination with a body portion provided with an articulated member, of a power shaft journaled in said body portion and operatively connected to said articulated member to cause the latter to describe an orbital path lying vertical and transversely of the bait, upon rotation of the shaft, a water wheel secured on the shaft and operating to revolve it when immersed in a current of water or drawn through it, said body portion and articulated member being formed in the general outline of a fish with the articulated member constituting the tail portion thereof, said shaft embodying a rear end portion projecting beyond the rear end of the body portion at an angle to the portion of the shaft journaled in said body portion and fixed to the articulated member.

2. In an artificial bait, wherein a bait body has a longitudinal shaft journaled therein, said shaft extending beyond the rear end of the body and bent at an angle to said shaft, a tail secured to the bent end of the shaft, and means associated with the forward end of the shaft for rotating the same.

3. In an artificial bait, a body portion and a tail, a shaft journaled through the body portion and anchored in the tail, and means for rotating said shaft, that portion of the shaft within the tail disposed at an obtuse angle to the longitudinal axis of the shaft to cause the tail to be constantly disposed at an angle to the body portion and describing an orbital path upon rotation of the shaft.

4. In an artificial bait, a bait body, a tail portion carried thereby, the connection between the bait body and tail portion including a shaft, and a propeller carried by the forward end of the shaft.

5. In an artificial bait, a bait body, a tail portion carried thereby, the connection between the bait body and tail portion including a shaft with the rear end extending in the tail portion and disposed at an angle to that portion of the shaft in the bait body, and propeller means secured to the shaft.

6. In an artificial bait, a bait body, a tail portion carried thereby, the connection between the bait body and tail portion including a shaft journaled in the bait body and having an angularly bent rear end fixed in the tail portion.

7. In an artificial bait, a bait body, a tail portion carried thereby, the connection between the bait body and tail portion including a shaft journaled in the bait body and having an angularly bent rear end fixed in the tail portion, and a propeller secured to the forward end of the shaft.

8. In an artificial bait wherein the same is constructed in a manner to create the impression of a crippled fish when in use, said bait including a body, a shaft journaled therein, and projecting from the rear end of the body, a tail portion fixed to the rear end of the shaft, a propeller associated with the forward end of the shaft, and said shaft bent between the body and tail portion to dispose the tail portion at the desired angle relative to the longitudinal axis of the bait body to cause the tail portion to travel in a circuitous path in simulation of a crippled fish.

9. In an artificial bait, a bait body, a tail portion movable relative to the body, and means for moving the tail portion relatively to the body, the connection between the bait body and tail portion being constructed in a manner to cause the tail portion to move in a circuitous path, the diameter of which is greater than the diameter of the bait body.

10. In an artificial bait, the combination with a body portion having an articulated member associated therewith, of a power shaft journaled in said body portion and operatively connected to said articulated member to cause the latter to describe an orbital path lying vertically and transversely of the bait, upon rotation of the shaft, and a water wheel secured on the shaft and operating to revolve it when immersed in a current of water or drawn therethrough.

11. In an artificial bait, the combination with a body portion having an articulated member associated therewith, of a power shaft journaled in said body portion and operatively connected to said articulated member to cause the latter to describe an orbital path lying vertically and transversely of the bait, upon rotation of the shaft, a water wheel secured on the shaft and operating to revolve it when immersed in a current of water or drawn therethrough, said body portion and articulated member being formed in the general outline of a fish with the articulated member constituting the tail portion thereof.

In testimony whereof I affix my signature.

BERT G. GOBLE.